United States Patent
Ragnarsson

(10) Patent No.: US 11,491,589 B2
(45) Date of Patent: Nov. 8, 2022

(54) LASER BRAZING SYSTEM WITH A JIG FOR CONTACTING THE BRAZING WIRE AND FOR BLOCKING A FIRST PART OF A LASER BEAM IN ASSOCIATION WITH A DETECTOR, METHOD OF MONITORING A LASER BRAZING SYSTEM

(71) Applicant: VOLVO TRUCK CORPORATION, Gothenburg (SE)

(72) Inventor: Fredrik Ragnarsson, Röbäck (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 503 days.

(21) Appl. No.: 16/606,667

(22) PCT Filed: Apr. 19, 2017

(86) PCT No.: PCT/EP2017/059258
§ 371 (c)(1),
(2) Date: Oct. 18, 2019

(87) PCT Pub. No.: WO2018/192646
PCT Pub. Date: Oct. 25, 2018

(65) Prior Publication Data
US 2021/0394314 A1 Dec. 23, 2021

(51) Int. Cl.
*B23K 1/00* (2006.01)
*B23K 26/00* (2014.01)
(Continued)

(52) U.S. Cl.
CPC ........ *B23K 37/0211* (2013.01); *B23K 1/0056* (2013.01); *B23K 3/063* (2013.01);
(Continued)

(58) Field of Classification Search
CPC .. B23K 37/0211; B23K 1/0056; B23K 3/063; B23K 3/08; B23K 26/032;
(Continued)

(56) References Cited

U.S. PATENT DOCUMENTS 4,700,044 A * 10/1987 Hokanson ............... H05K 13/06
219/121.64
5,601,737 A * 2/1997 Asahi ................. B23K 26/0665
219/121.84
(Continued)

FOREIGN PATENT DOCUMENTS

AT 517184 A1 11/2016
CN 2608209 Y 3/2004
(Continued)

OTHER PUBLICATIONS

Translation of Jp 2009090360A (not date available).*
(Continued)

*Primary Examiner* — Kiley S Stoner
(74) *Attorney, Agent, or Firm* — Venable LLP; Jeffri A. Kaminski

(57) ABSTRACT

The invention relates to a laser brazing system, comprising a braze tool having a laser configured to emit a laser beam along a radiation path, and a braze wire tool being configured to guide a braze wire along a wire path intersecting the laser beam. The system comprises a jig comprising a first alignment surface and a first blocking surface, wherein the first alignment surface is configured to be in contact with the braze wire while the first blocking surface blocks at least a first part of the emitted laser beam, and a detector arranged in the radiation path and configured to detect the emitted light of the laser beam passing the jig.

19 Claims, 7 Drawing Sheets

(51) Int. Cl.
  *B23K 37/02* (2006.01)
  *B23K 1/005* (2006.01)
  *B23K 3/06* (2006.01)
  *B23K 3/08* (2006.01)
  *B23K 26/03* (2006.01)

(52) U.S. Cl.
  CPC .............. *B23K 3/08* (2013.01); *B23K 26/032* (2013.01); *B23K 37/0247* (2013.01)

(58) Field of Classification Search
  CPC .... B23K 37/0247; B23K 1/20; B23K 26/705; B23K 26/066; B23K 26/073
  USPC ........................................ 219/121.63–121.66
  See application file for complete search history.

(56) References Cited

U.S. PATENT DOCUMENTS

| | | | | |
|---|---|---|---|---|
| 6,143,378 A | * | 11/2000 | Harwell | ................ B33Y 10/00 427/595 |
| 8,471,173 B2 | * | 6/2013 | Miessbacher | .......... B23K 28/02 219/136 |
| 2003/0149426 A1 | | 8/2003 | Yee et al. | |
| 2009/0057373 A1 | * | 3/2009 | Darzi | ................... B23K 26/123 219/74 |
| 2010/0084386 A1 | * | 4/2010 | Masuda | ............... B23K 26/066 219/121.67 |
| 2012/0267349 A1 | | 10/2012 | Berndl et al. | |
| 2015/0336271 A1 | * | 11/2015 | Spicer | .................. B23K 37/047 228/9 |
| 2017/0028495 A1 | * | 2/2017 | Jin | ....................... B23K 26/702 |
| 2019/0061053 A1 | * | 2/2019 | Yang | .................. B23K 26/0884 |
| 2019/0101443 A1 | * | 4/2019 | Odanaka | ............ B23K 26/0869 |
| 2019/0270246 A1 | * | 9/2019 | Fujishima | .............. B23K 26/02 |
| 2020/0047274 A1 | * | 2/2020 | Tani | ..................... G01B 5/0014 |
| 2021/0316368 A1 | * | 10/2021 | Morita | .................... B22F 10/80 |
| 2021/0370409 A1 | * | 12/2021 | Takushima | ........... B23K 26/032 |

FOREIGN PATENT DOCUMENTS

| | | | | |
|---|---|---|---|---|
| CN | 100476378 C | | 4/2009 | |
| CN | 102015193 A | | 4/2011 | |
| CN | 103042308 A | | 4/2013 | |
| CN | 104874900 A | | 9/2015 | |
| CN | 105473271 A | | 4/2016 | |
| JP | 02268495 A | * | 11/1990 | |
| JP | 05309486 A | * | 11/1993 | |
| JP | H06344163 A | | 12/1994 | |
| JP | H1081447 A | | 3/1998 | |
| JP | H11354916 A | | 12/1999 | |
| JP | 2006322820 A | | 11/2006 | |
| JP | 2009090360 A | | 4/2009 | |
| JP | 2012106270 A | | 6/2012 | |
| WO | WO-2019135505 A1 | * | 7/2019 | ........... B23K 26/066 |

OTHER PUBLICATIONS

A. Salminen; "The filler wire-laser beam interaction during laser welding with low alloyed steel filler wire"; ISSN 1392-1207. Mechanika. 2010. Nr.4(84); pp. 67-74 (8 pages).
International Search Report and Written Opinion in corresponding International Application No. PCT/EP2017/059258 dated Feb. 9, 2018 (12 pages).
International Preliminary Report on Patentability in corresponding International Application No. PCT/EP2017/059258 dated Apr. 3, 2019 (7 pages).
China Office Action dated Dec. 24, 2020 in corresponding China Patent Application No. 201780089800.7, 7 pages.

* cited by examiner

LASER BRAZING SYSTEM WITH A JIG FOR CONTACTING THE BRAZING WIRE AND FOR BLOCKING A FIRST PART OF A LASER BEAM IN ASSOCIATION WITH A DETECTOR, METHOD OF MONITORING A LASER BRAZING SYSTEM

CROSS-REFERENCE TO RELATED APPLICATIONS

This application is a U.S. National Stage application of PCT/EP2017/059258, filed Apr. 19, 2017 and published on Oct. 25, 2018 as WO/2018/192646, all of which is hereby incorporated by reference in its entirety.

TECHNICAL FIELD

The invention relates to a laser brazing system, as well as to a method of monitoring a laser brazing system.

The invention can be applied in manufacturing and production lines of various components, e.g. for joining metal sheets or panels in the auto industry including heavy-duty vehicles such as trucks, buses and construction equipment. Although the invention will be described with respect to a truck, the invention is not restricted to this particular vehicle, but may also be used in other applications.

BACKGROUND

Laser brazing is often used in automated high volume manufacturing lines. Using this technique two sheets or panels are joined by a filler material, which normally is provided as a wire. A laser is directed to irradiate the wire of filler material which then melts and flows to join the two sheets or panels. Hence the two sheets or panels can be joined without the need of substantially melting the sheets or panels.

During laser brazing the position of the braze wire in relation to the laser beam is important; normally the position of the wire is set to a predefined value, for instance to be centrally aligned with the laser beam. The position of the wire can however be altered accidentally for instance if the wire gets stuck or in case of a failure in the braze tool components. If the position of the wire is outside the predefined working range, the braze seam will be defective and the brazed part must be repaired or even discarded.

For ensuring correct operation of the braze tool the wire position may be inspected manually after a certain number of brazing operations. Such monitoring will have a negative impact on the productivity because the process has to be stopped during the inspection. Also, in a case where the wire is positioned wrongly, it is possible that several faulty parts are produced before the misalignment of the wire is detected.

JPH-06344163A describes a system which is configured to determine if the wire is positioned correctly or not by providing a visible laser beam converging to the desired position of the wire. An optical detector is arranged to detect laser light being reflected from the wire and by analysing the amount of detected light it is possible to determine if the wire is positioned correctly or not.

Although it is possible to determine if the wire is positioned correctly or not, an auxiliary laser source is required. This is due to the fact that if the original laser is used for monitoring the position of the wire, the wire will melt. Hence, it would be advantageous to provide a less complex laser brazing system.

SUMMARY

An object of the invention is to provide a laser brazing system which can be used to automatically monitor the position of the braze wire in a simple and reliable manner.

According to a first aspect, the object is achieved by a laser brazing system according to claim 1. According to a second aspect, the object is achieved by a method for monitoring a laser brazing system according to claim 12. It should however be realized that the method for monitoring could be used for any brazing tool for which the position of the braze wire should be fixed relative the laser beam.

By the provision of a jig which shields off the wire while at the same time blocks a part of the emitted laser beam, it is possible to monitor the wire position without using additional lasers.

According to an embodiment the jig further comprises a second alignment surface facing a different direction than the first alignment surface and a second blocking surface facing a different direction than the first blocking surface. Hence it is possible to monitor the wire position without using a pre-stored reference value, but by comparing detected light when the first blocking surface is aligned with the laser beam with detected light when the second blocking surface is aligned with the laser beam.

The second alignment surface may be configured to be in contact with the braze wire while the second blocking surface blocks at least a second part of the emitted laser beam.

In an embodiment the laser brazing system further comprises a control unit being configured to receive a first signal from the detector, the first signal comprising information relating to the amount of detected laser light when the first blocking surface blocks at least a first part of the emitted laser beam, and to determine the position of the braze wire relative the radiation path based on said signal. Hence automatic determination of the position of the braze wire relative the laser beam is possible.

In an embodiment the control unit is configured to determine the position of the braze wire by determining if the braze wire is positioned within or outside a predetermined range. This allows the operator to set boundaries within which the braze wire is allowed to be positioned.

In an embodiment the control unit is configured to compare the information of the first signal with a pre-stored reference value. Hence it is possible to automatically determine if the position of the braze wire is within a predefined acceptable range.

In an embodiment the reference value is at least one threshold value corresponding to the braze wire being positioned outside the predetermined range, and the reference value may correspond to the amount of detected light when the braze wire is arranged in its desired position.

According to an embodiment the control unit is further configured to receive a second signal from the detector, the second signal comprising information relating to the amount of detected laser light when the second blocking surface blocks at least a second part of the emitted laser beam. Improved determination of the wire position is thus possible, as the risk for measurement faults is reduced.

In an embodiment the control unit is configured to determine a ratio from the first and second signals, and to compare the determined ratio with a reference value. Such comparison of the ratio will provide a very simple and reliable criteria for determining if the braze wire is positioned correctly.

In an embodiment the jig is connected to a drive unit, and the control unit is configured to move the jig to and away from a first and/or a second measuring position by controlling the drive unit. Hence automatic control of the jig's position is provided. It should however be noted that in alternative embodiments the position of the jig is fixed, whereby the braze tool is moveable relative the jig.

According to a second aspect a method for monitoring a laser brazing system is provided. The laser brazing system comprises a laser braze tool configured to emit a laser beam along a radiation path, and a braze wire being guided along a wire path intersecting the radiation path. The method comprises blocking at least a first part of the emitted laser beam by means of a jig, and measuring the amount of emitted light of the laser beam passing the jig.

In an embodiment the step of blocking at least a first part of the emitted laser beam comprises arranging the jig in a first measuring position in which a first alignment surface is in contact with the braze wire, and a first blocking surface blocks at least a first part of the emitted laser beam.

In an embodiment the method further comprises comparing the amount of detected light with a pre-stored reference value.

According to an embodiment the method further comprises determining, based on the comparison between the amount of detected light and the reference value, the position of the braze wire relative the radiation path. The method may further determine if the braze wire is positioned within or outside a predetermined area.

In an embodiment the reference value corresponds to the amount of detected light when the braze wire is arranged in its desired position.

In an embodiment the method further comprises blocking a second part of the emitted laser beam by means of the jig. Such blocking of a second part of the emitted laser beam may comprise arranging the jig in a second measuring position in which a second alignment surface facing a different direction than the first alignment surface is in contact with the braze wire, and a second blocking surface facing a different direction than the first blocking surface blocks at least a second part of the emitted laser beam.

According to an embodiment the method further comprises determining a ratio from a first signal comprising information relating to the amount of detected light when the jig is arranged in the first measuring position, and a second signal comprising information relating to the amount of detected light when the jig is arranged in the second measuring position, and to compare the determined ratio with a reference value.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
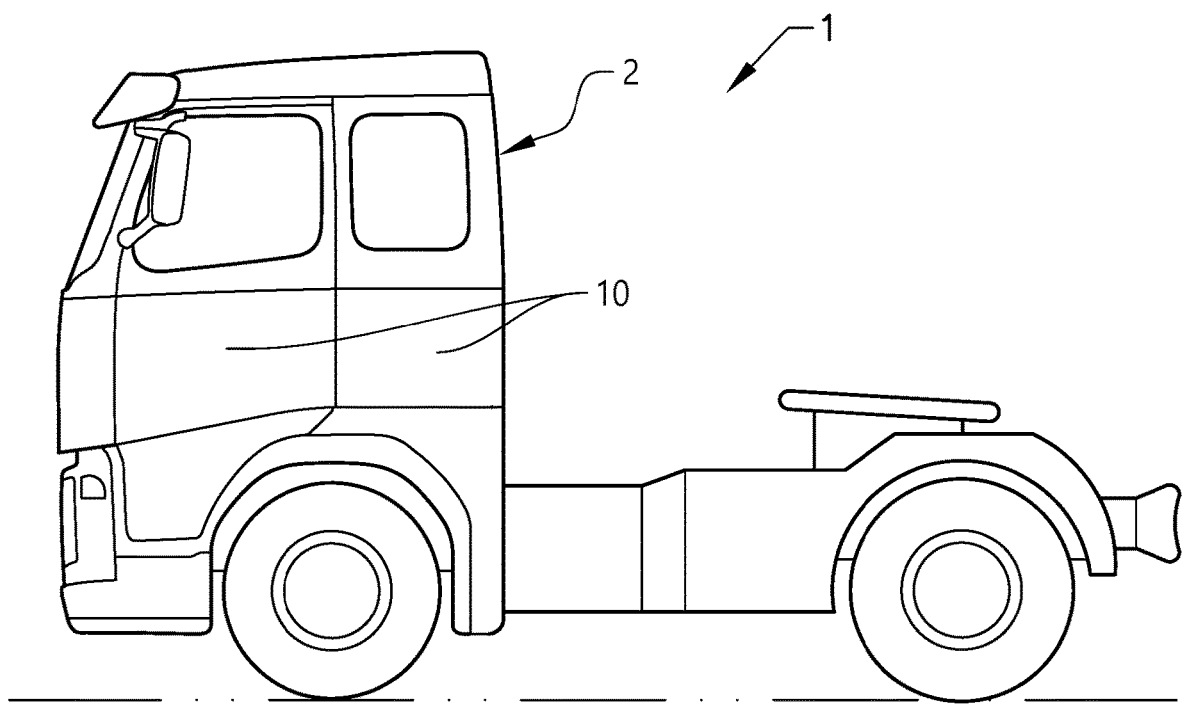
FIG. 1 is a schematic view of a truck.

Starting in FIG. 1 a vehicle 1 is shown, here in the form of a truck. The truck 1 has a cab 2, being manufactured by the joining of several plate-like segments 10. At least one of these segments 10 is produced by laser brazing.

Figure 2A:
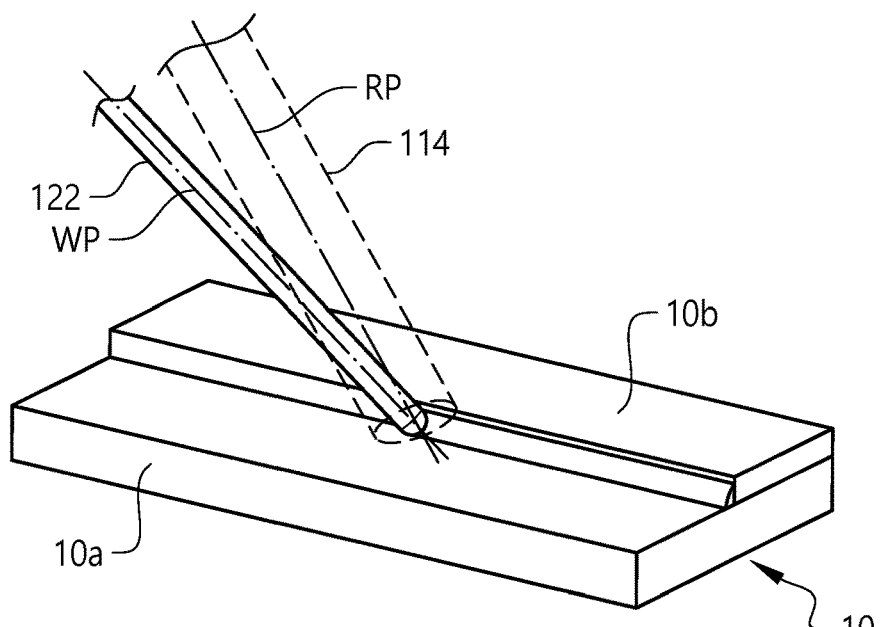
FIG. 2a is an isometric view of two sheets being joined by laser brazing.

In FIG. 2 the general principle of laser brazing is illustrated. A first plate-like material 10a is arranged close to, or in contact with a second plate-like material 10b. The first and second plate-like materials 10a-b may e.g. be in the form of metal sheets or other suitable structures. For joining the first plate-like material 10a to the second plate-like material 10b in order to form a segment 10 a braze wire 122 is arranged at the interface between the first and second plate like materials 10a-b. The braze wire 122 is further irradiated by means of a laser beam 114 which is configured to melt the braze wire 122 and to provide heating of the plate-like materials 10a-b. As the braze wire 122 melts it will flow at the interface between the first and second plate-like materials 10a-b for ensuring proper joining of the materials 10a-b. It should be noted that the formed segment 10 may be used for various applications and industries, and is by no means limited to the use within the auto industry.

Figure 2B:
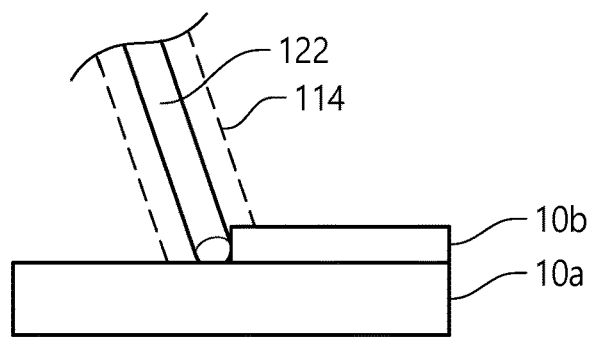
FIG. 2b is a side view of a braze wire being positioned centrally relative the laser beam.

In FIG. 2b the position of the braze wire 122 is further illustrated. As is shown, the braze wire 122 is aligned relative the laser beam 114. In some embodiments the braze wire 122 is centrally aligned, which means that at some point the longitudinal axis, or wire path WP of the braze wire 122 will intersect the longitudinal axis, or radiation path RP of the laser beam 114 (see FIG. 2a).

Figure 2C:
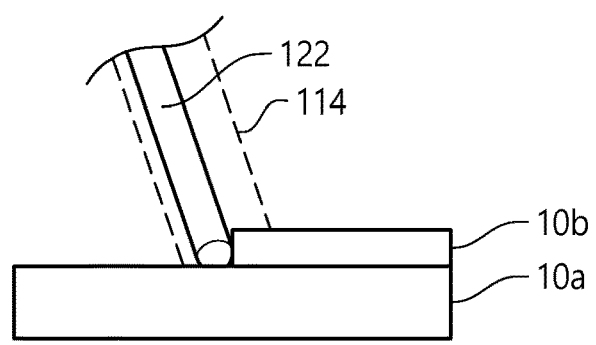
FIG. 2c is a side view of a braze wire being positioned off centre relative the laser beam.

In FIG. 2c another situation is shown, in which the braze wire 122 is positioned off centre relative the laser beam 114. This means that at no point the wire path WP of the braze wire 122 will intersect the radiation path RP of the laser beam 114.

Figure 3A:
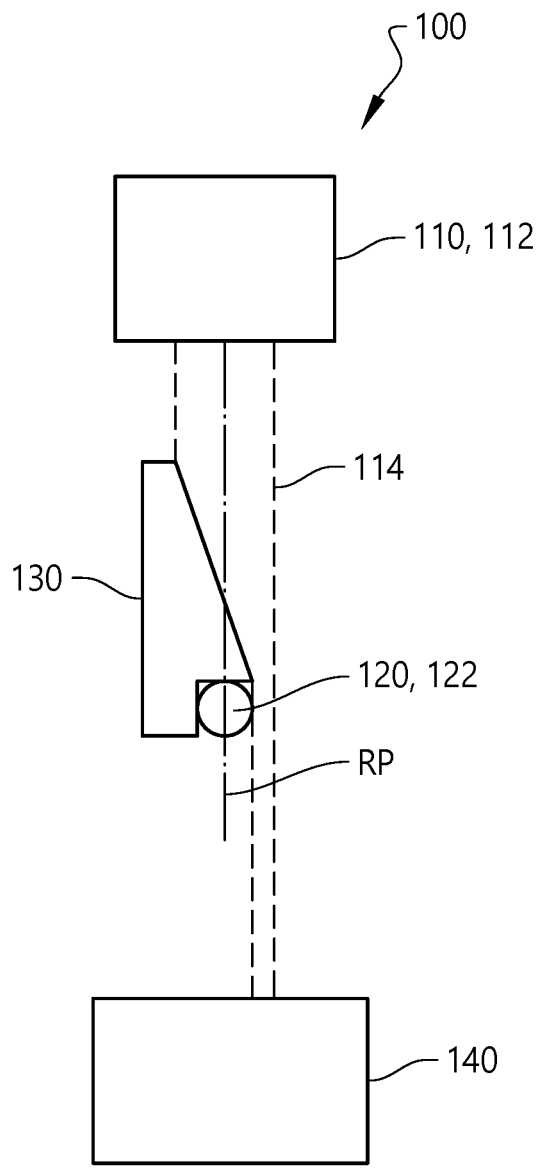
FIG. 3a is a side view of a laser brazing system according to an embodiment, in which the braze wire is positioned centrally relative the laser beam.
Figure 3B:
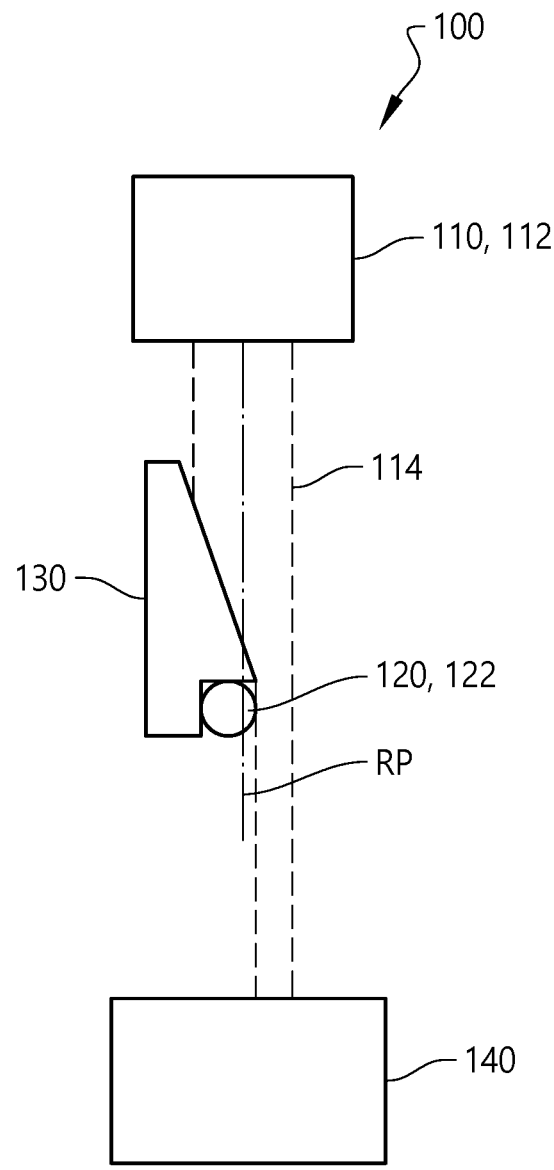
FIG. 3b is a side view of the laser brazing system shown in FIG. 3a, however the braze wire is positioned off centre relative the laser beam.

As explained above it is important that the braze wire 122 is positioned correctly relative the laser beam 114. To ensure this a laser brazing system 100 is provided. An embodiment of such laser brazing system 100 is shown in FIGS. 3a-b. Actually these two figures show the same embodiment of the laser brazing system 100, only the position of the braze wire 122 relative the laser beam 114 is different.

The laser brazing system 100 comprises a braze tool 110. The braze tool 110 has a laser 112 configured to emit a laser beam 114 along a radiation path RP. For this, the braze tool 110 may include suitable optics and driver circuits (not shown). In addition to this, the brazing system 100 has a braze wire tool 120 being configured to guide a braze wire 122 along a wire path WP. In order for the laser beam 114 to affect the braze wire 122, the wire path WP intersects the laser beam 114 as described above. In an optional embodiment the box denoted with reference numeral 112 encloses suitable optics, whereby the laser is provided remote from the optics 112 and is connected to the optics 112 via an optical fiber.

The laser 112 is selected such that the braze wire 122 will melt when it is exposed to the laser beam 114.

The brazing system 100 further comprises a jig 130. The jig 130 is configured to be positioned relative the braze wire 122 such that the braze wire 122 abuts the jig 130, and whereby the jig 130 also blocks a part of the emitted laser beam 114. When in this position, measurement is performed. The brazing system 100 also has a detector 140 which is configured to detect the light passing the jig 130, i.e. the emitted light not being blocked by the jig 130.

The general principle of operation will now be explained with respect to FIGS. 3a and 3b. In FIG. 3a the braze wire 122 is positioned centrally relative the laser beam 114. When the jig 130 is arranged in contact with the braze wire 122, a certain amount of light will reach the detector 140. On the other hand, when the braze wire 122 is arranged off centre relative the laser beam 114 as is indicated in FIG. 3b, a different amount of light will reach the detector 140. Hence it will be possible to determine if the braze wire 122 is positioned correctly or not by analysing the signal from the detector 140. Yet further, if the braze wire 122 is not positioned correctly it is also possible to determine the level of mis-position of the braze wire 122. This method of determining the position of the braze wire 122 preferably requires that the power density of the laser beam is symmetrical around the radiation path RP.

Figure 4:
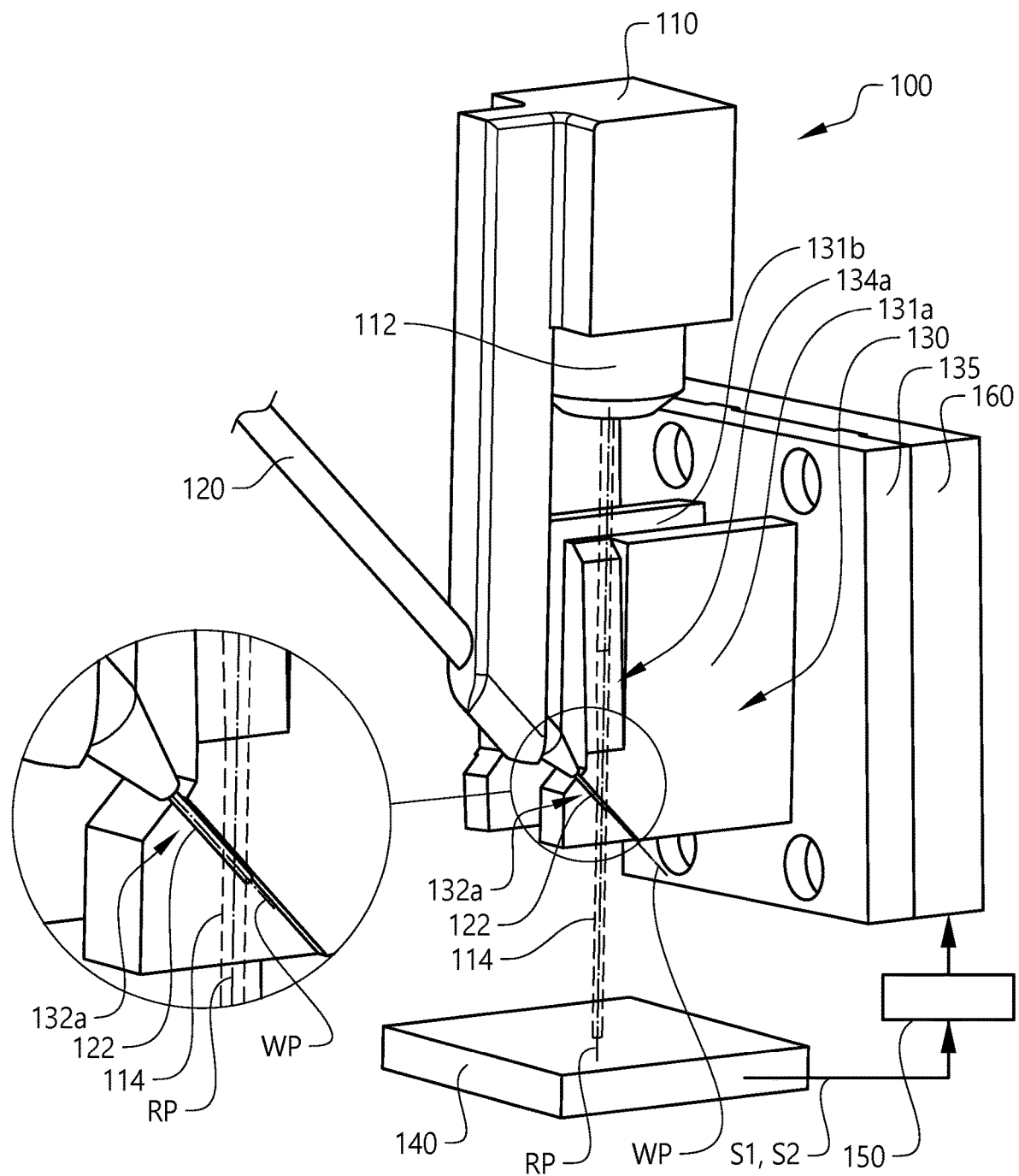
FIG. 4 is an isometric view of a laser brazing system according to an embodiment, wherein the jig is positioned in a first measuring position.

Further details of the laser brazing system 100 are shown in FIG. 4. As can be seen the jig 130 is provided with two symmetrical parts 131a, 131b. Each part 131a, 131b has an alignment surface 132a-b and a blocking surface 134a-b.

Both parts 131a-b are fixedly mounted on a support 135, which is driven by a drive unit 160. Control of the drive unit 160 is provided by means of a control unit 150, which will be further described in the following. The drive unit 160, e.g. being realized in the form of a linear motor or other suitable component, is adapted to move the jig 130 from an idle position, in which the jig 130 does not affect the interaction between the laser beam 114 and the braze wire 122, and at least a first measuring position. Optionally, the drive unit 160 is further configured to move the jig 130 to a second measuring position as will also be described further below.

Although the drive unit 160 is taught to be connected to the jig 130, it should be realized that the drive unit 160 could equally well be connected to the laser brazing system 100 or any other associated structure as long as the drive unit 160 is able to change the relative position between the jig 130 and the braze wire 122.

Considering the first part 131a only, in the first measuring position the first alignment surface 132a is configured to be in contact with the braze wire 122 such that the first alignment surface 132a forms a stop surface when the braze wire 122 approaches the first part 131a of the jig 130 from the left. This is particularly shown in the enlarged section of FIG. 4. The first part 131a is thereby acting on the braze wire 122 in the same manner and direction as shown in FIGS. 3a-b.

When the jig 130 is positioned such that the first alignment surface 132a is in contact with the braze wire 122, the jig 130 prevents the braze wire 122 to be exposed to the laser beam 114. This means that the alignment surface 132a must be configured such that appropriate shading of the braze wire 122 is accomplished. Further, the first blocking surface 134a (i.e. the blocking surface of the first part 131a of the jig 130) will block at least a first part of the emitted laser beam 114. The exact amount of light being blocked is dependent on the position of the braze wire 122 relative the laser beam 114. For blocking the light the blocking surface 134a is tilted whereby light hitting the blocking surface 134a will be absorbed or reflected away from the radiation path RP. For achieving a correct position of the blocking surface 134a, the jig 130 may be moved such that the alignment surface 132a is pressed towards the braze wire 122. When the drive unit 160 experiences a certain resistance, corresponding to the jig 130 being prevented to move further, a stop signal may be generated by the control unit 150.

The portion of light not being reflected by the blocking surface 134a will hit the detector 140. The detector 140 is arranged in the radiation path RP and is configured to transmit a signal S1 to the control unit 150 when incident light is detected. The signal S1 comprises information relating to the amount of detected laser light when the first blocking surface 134a blocks at least a first part of the emitted laser beam 114, for example the signal S1 comprises information relating to the detected amount of light. From this information the control unit 150 is configured to determine the position of the braze wire 122 relative the radiation path RP of the laser beam 114. Such determination may be made in many various ways, some of which will be described in the following.

According to one example, the control unit 150 may have access to one or more pre-stored reference values representing the expected amount of detected light corresponding to a situation when the braze wire 122 is positioned centrally relative the radiation path RP of the laser beam 114. In case of only one reference value, the control unit 150 may be configured to compare the detected amount of light (i.e. the detected light value of the signal S1) with the reference value and to determine how well these values match. For example the resulting matching value, which may be determined by dividing the detected amount of light with the reference value, may represent an indication if the braze wire 122 is positioned within or outside a predetermined area. A position of the braze wire 122 of ±20% relative a perfectly central alignment may e.g. be accepted, whereby the control unit 150 is configured to determine if the ratio between the detected amount of light and the reference value is within or without an interval corresponding to such ±20% position control; if within, then it is determined that the braze wire 122 is positioned correctly. Notably, the relationship between measured amount of light and the position of the braze wire 122 is not necessarily linear.

According to another example the control unit 150 may have access to two different reference values. These two values may represent the maximum and minimum value of the detected light, whereby the control unit 150 is configured to determine that the braze wire 122 is positioned correctly if the detected amount of light lies in between the maximum and the minimum reference values.

Figure 5:
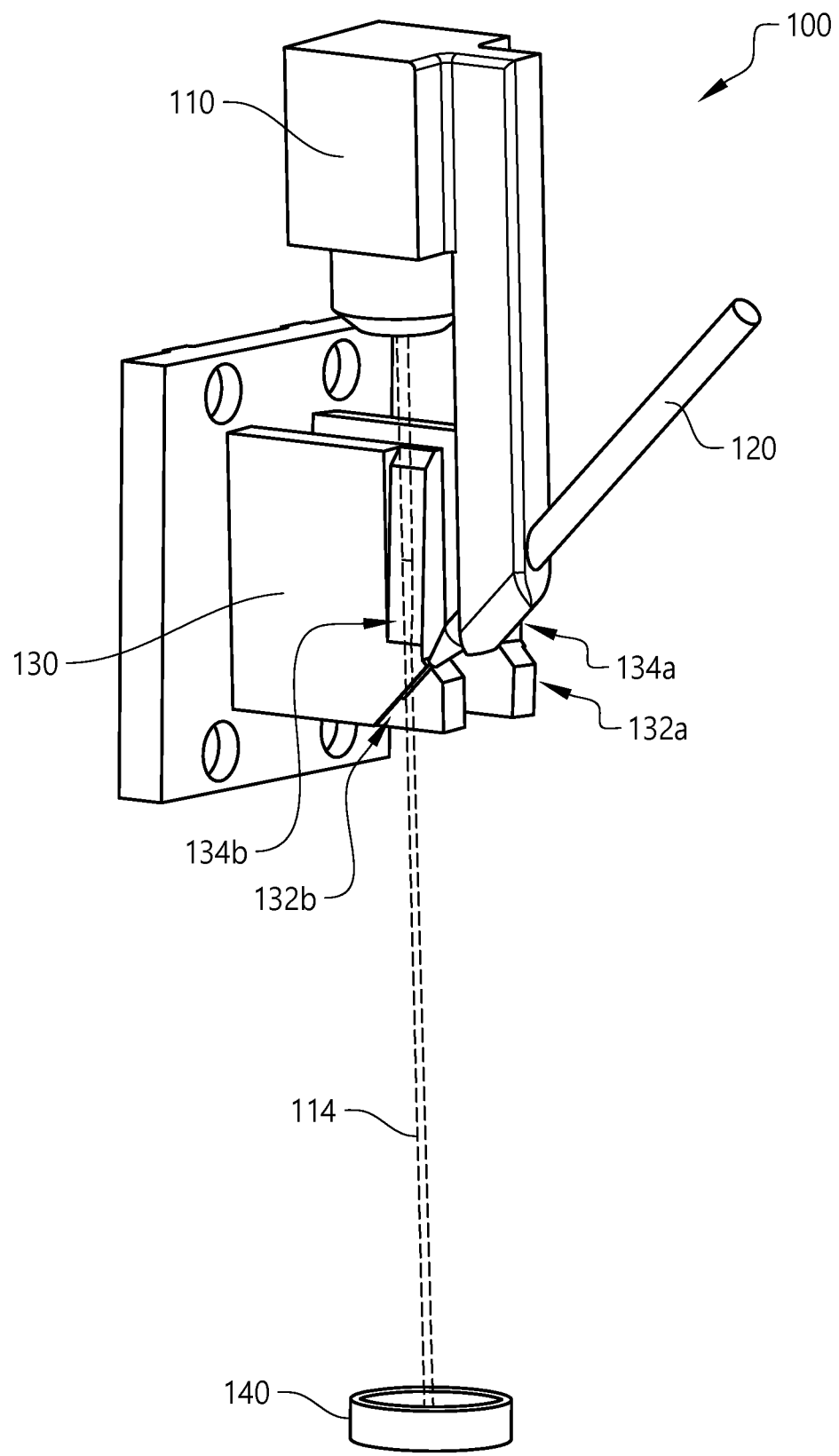
FIG. 5 is an isometric view of the laser brazing system shown in FIG. 4, wherein the jig is positioned in a second measuring position.

According to a yet further example the laser brazing system 100 is configured to take advantage of the fact that the jig 130 also comprises a second part 131b having a second alignment surface 132b and a second blocking surface 134b. These surfaces 132b, 134b are arranged symmetrically relative the first alignment surface 132a and the first blocking surface 134a such that the jig 130 may be positioned in a second measuring position in which the second alignment surface 132b is arranged in contact with the braze wire 122 while the second blocking surface 134b is blocking at least a part of the laser beam 114. This position of the jig 130 is shown in FIG. 5.

The second alignment surface 132b is facing a different direction than the first alignment surface 132a; preferably the first and second alignment surfaces 132a-b are facing opposite directions. Correspondingly the second blocking surface 134b is facing a different direction than the first blocking surface 134a; preferably the first and second blocking surfaces 134a-b are facing opposite directions. In this context the term opposite is used for describing two directions being separated by 180° relative a vertical line. This means that for a specific direction of one surface 132a, 134a, the opposite direction of the other surface 132b, 134b is preferably given by rotating the first direction 180° along a vertical axis of rotation and in a horizontal plane of rotation.

When the jig 130 is arranged in the second measuring position the control unit 150 is configured to receive a second signal S2 from the detector 140. The second signal S2 comprises information relating to the amount of detected laser light when the second blocking surface 134b blocks at least a second part of the emitted laser beam 114. Similar to the first signal S1, the second signal S2 may comprise information related to the measured amount of light.

When receiving the second signal S2, the control unit 150 may either process the second signal S2 in the same manner as the first signal S1, i.e. comparing the second signal S2 with one or more reference values being pre-stored.

However, when the control unit 150 is having access to both signals S1 and S2 a comparison between these signals S1, S2 can be made in order to determine the position of the braze wire 122 relative the radiation path RP of the laser beam 114.

Figure 6:
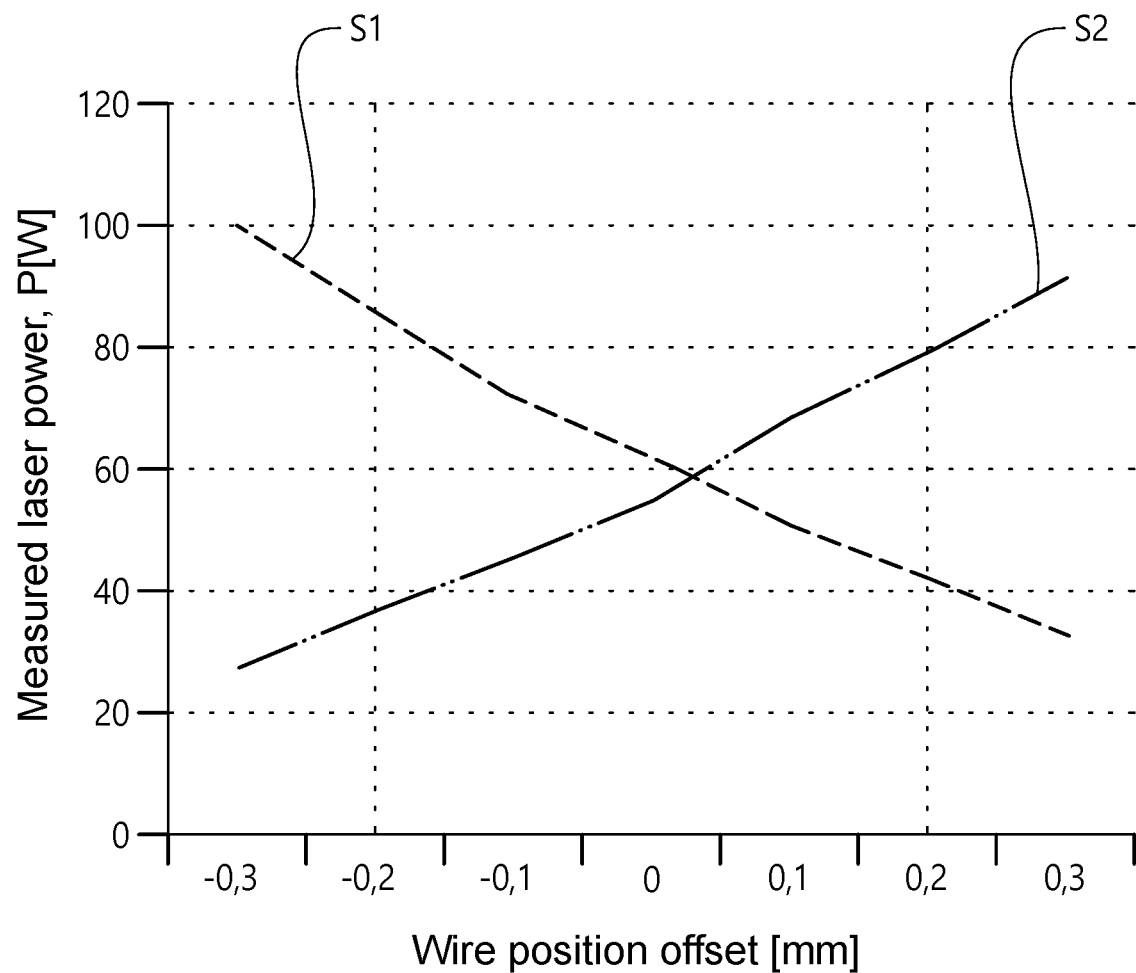
FIG. 6 is a diagram showing measured amount of laser light as a function of the position of the braze wire.

The relationship between each signal S1, S2 and the position of the braze wire 122 is shown in FIG. 6. Starting with the first signal S1, an initial value is obtained when the braze wire 122 is positioned offset in the negative direction. The value decreases as the offset decreases, and reaches a mid-value when the braze wire 122 is centrally aligned. From here the measured amount of light further decreases as the offset increases in the positive direction. The characteristics of the second signal S2 is opposite to the characteristics of the first signal S1; the maximum value is obtained at a maximum offset in the positive direction.

When having access to both signals S1, S2 the control unit 150 may be configured to determine the position of the braze wire 122 relative the laser beam 114 by comparing the two signals S1, S2. Such comparison may e.g. be made by dividing the value of S1 with the value of S2 thus forming a ratio. For a setup requiring the braze wire 122 to be positioned centrally in the laser beam 114, a resulting value close to 1 would indicate that the braze wire 122 is positioned correctly, while a resulting value different from 1 would indicate that the braze wire 122 is not having its desired position.

In the example shown in FIG. 6, it would e.g. be possible to detect the wire position being outside a desirable working range of ±0.2 mm. The actual position is determined by calculating the ratio between the value of S1 and the value of S2. Having a ratio greater than 2 would indicate that the wire position offset is greater than approximately 0.2 mm. Having a ratio less than 0.5 would indicate that the wire position offset is less than approximately −0.2 mm. When the braze wire 122 is centered in the laser beam the ratio is expected to be near 1. Hence, it can be determined that the braze wire 122 is positioned correctly if $0.5 \leq R_{S1, S2} \leq 2$, where $R_{S1, S2}$ is the ratio between the current value of S1 and the current value of S2.

By comparing the signals S1 and S2 there is no need for pre-stored references values. Further, the laser brazing system 100 also becomes less sensitive for measurement errors, as the impact of such errors will be reduced.

Figure 7:
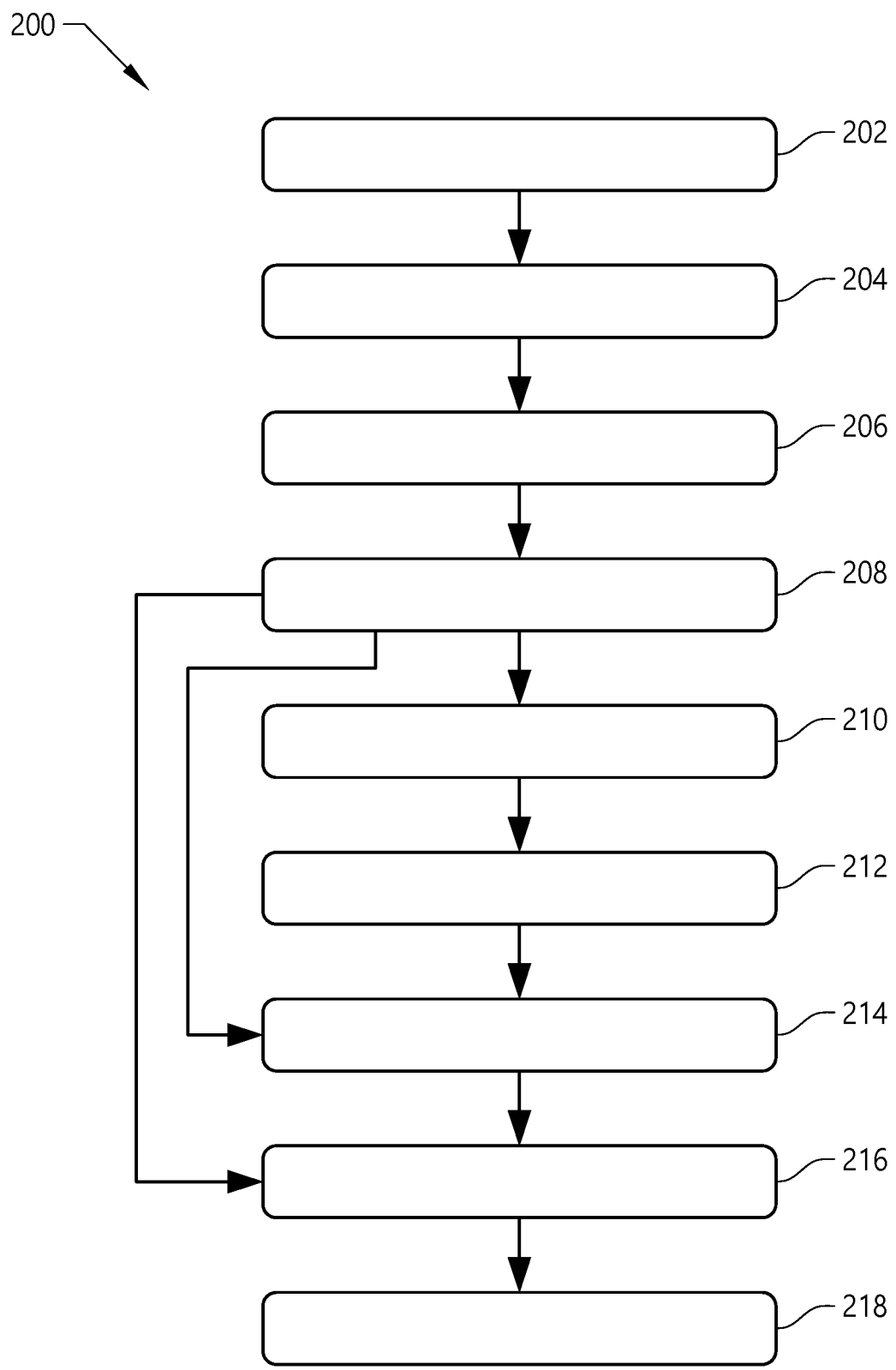
FIG. 7 is a schematic view of a method for monitoring a laser brazing system according to an embodiment.

Now turning to FIG. 7 an example of a method 200 for monitoring a laser brazing system 100 will be explained. The method 200 comprises activating 202 a laser braze tool 110 to emit a laser beam 114 along a radiation path RP, and providing 202 a braze wire 122 being guided along a wire path WP intersecting the laser beam 114. Following this the method 200 further comprises blocking 206 at least a first part of the emitted laser beam 114 by means of a jig 130, and measuring 208 the emitted light of the laser beam passing the jig 130. For proper operation the laser beam 114 should be emitted only when the braze wire 122 is shaded by means of the jig 130 for avoiding undesired melting of the braze wire 122.

The method 200 may from this point continue to blocking 210 at least a second part of the emitted laser beam 114 by means of the jig 130, and subsequently detecting 212 the emitted light of the laser beam passing the jig 130. When blocked light has been detected for both positions of the jig 130, the method 200 comprises 214 determining a ratio from the detected values resulting from 208 and 212. Once the ratio is determined, in 216 the ratio is compared with a pre-stored reference value. From this, in 218, the position of the braze wire 122 is determined.

After 208 the method 200 may jump directly to comparing 216 the detected light with a pre-stored reference, followed by 218 of determining the position of the braze wire 122. It should be noted that the value of the pre-stored reference will be different if the detected light is used for comparison than if the determined ratio is used for comparison.

The above-mentioned laser braze system 100 is a very efficient system for monitoring the laser brazing process; by providing automatic movement of the jig 130 determining the braze wire position may be performed extremely fast prior to each initiated brazing process.

It is to be understood that the present invention is not limited to the embodiments described above and illustrated in the drawings; rather, the skilled person will recognize that many changes and modifications may be made within the scope of the appended claims.

The invention claimed is:

1. A laser brazing system, comprising a braze tool having a laser configured to emit a laser beam along a radiation path, and a braze wire tool being configured to guide a braze wire along a wire path intersecting the laser beam, characterized by a jig comprising a first alignment surface and a first blocking surface, wherein the first alignment surface is configured to be in contact with the braze wire while the first blocking surface blocks at least a first part of the emitted laser beam, and a detector arranged in the radiation path and configured to detect the emitted light of the laser beam passing the jig.

2. The brazing system according to claim 1, wherein the jig further comprises a second alignment surface facing a different direction than the first alignment surface and a second blocking surface facing a different direction than the first blocking surface.

3. The brazing system according to claim 2, wherein the second alignment surface is configured to be in contact with the braze wire while the second blocking surface blocks at least a second part of the emitted laser beam.

4. The brazing system according to claim 1, further comprising a control unit being configured to receive a first signal from the detector, the first signal comprising information relating to the amount of detected laser light when the first blocking surface blocks at least a first part of the emitted laser beam, and to determine the position of the braze wire relative the radiation path based on said signal.

5. The brazing system according to claim 4, wherein the control unit is configured to determine the position of the braze wire by determining if the braze wire is positioned within or outside a predetermined area.

6. The brazing system according to claim 5, wherein the control unit is configured to compare the information of the first signal with a pre-stored reference value.

7. The brazing system according to claim 6, wherein the reference value is at least one threshold value corresponding to the braze wire being positioned outside the predetermined area.

8. The brazing system according to claim 6, wherein the reference value corresponds to the amount of detected light when the braze wire is arranged in its desired position.

9. The brazing system according to claim 5, wherein the control unit is further configured to receive a second signal from the detector, the second signal comprising information relating to the amount of detected laser light when second blocking surface blocks at least a second part of the emitted laser beam.

10. The brazing system according to claim 9, wherein the control unit is configured to determine a ratio from the first and second signals, and to compare the determined ratio with the reference value.

11. The brazing system according to claim 1, wherein the jig is connected to a drive unit, and wherein the control unit is configured to move the jig to and away from a first and/or a second measuring position by controlling the drive unit.

12. A method for monitoring a laser brazing system, comprising: activating a laser braze tool to emit a laser beam along a radiation path, guiding a braze wire along a wire path intersecting the radiation path, characterized by blocking at least a first part of the emitted laser beam by arranging a jig in a first measuring position in which a first alignment surface is in contact with the braze wire, and a first blocking surface blocks at least a first part of the emitted laser beam, and detecting the emitted light of the laser beam passing the jig.

13. The method according to claim 12, further comprising comparing the amount of detected light with a pre-stored reference value.

14. The method according to claim 13, further comprising determining, based on the comparison between the amount of detected light and the reference value, the position of the braze wire relative the radiation path.

15. The method according to claim 14, further comprising determining if the braze wire is positioned within or outside a predetermined area.

16. The method according to claim 13, wherein the reference value corresponds to the amount of detected light when the braze wire is arranged in its desired position.

17. The method according to claim 12, further comprising blocking a second part of the emitted laser beam by means of the jig.

18. The method according to claim 12, wherein blocking a second part of the emitted laser beam comprises: arranging the jig in a second measuring position in which a second alignment surface facing a different direction than the first alignment surface is in contact with the braze wire, and a second blocking surface facing a different direction than the first blocking surface blocks at least a second part of the emitted laser beam.

19. The method according to claim 18, further comprising determining a ratio from a first signal comprising information relating to the amount of detected light when the jig is arranged in the first measuring position, and a second signal comprising information relating to the amount of detected light when the jig is arranged in the second measuring position, and to compare the determined ratio with a reference value.

* * * * *